Oct. 11, 1938.  J. M. BOLSTER  2,133,012
TREMOLO DEVICE FOR ACCORDIONS
Filed March 26, 1938
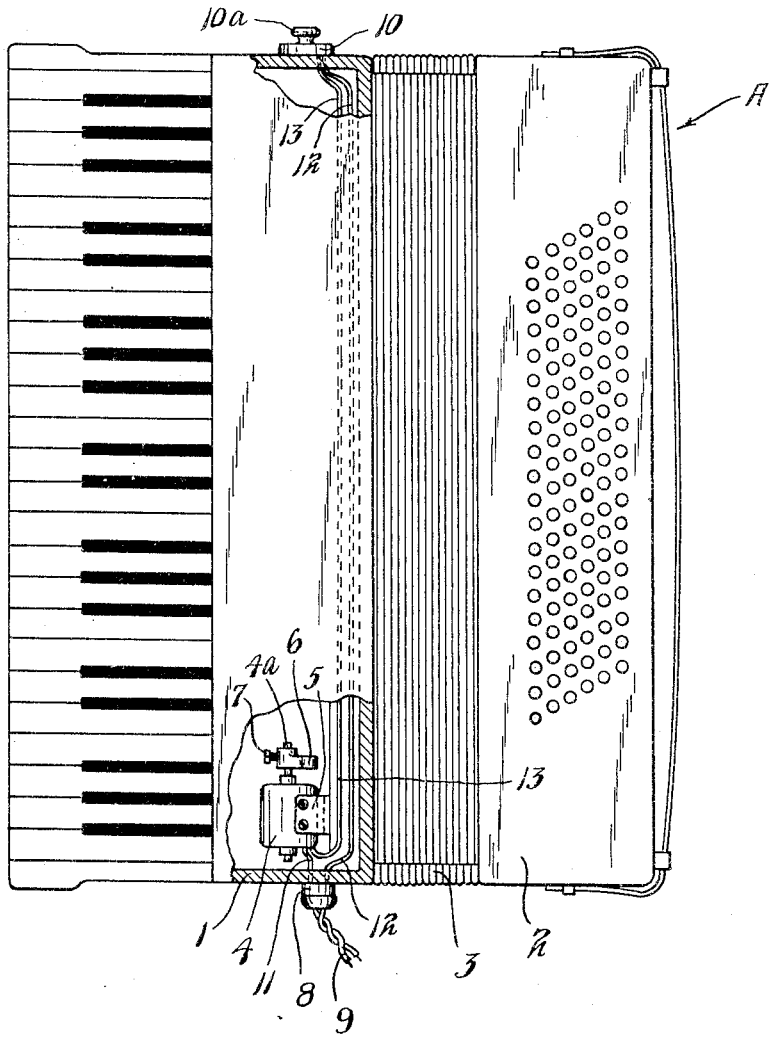
INVENTOR.
JOHN M. BOLSTER.
BY HIS ATTORNEYS.
Williamson & Williamson Patented Oct. 11, 1938

2,133,012

UNITED STATES PATENT OFFICE 2,133,012

TREMOLO DEVICE FOR ACCORDIONS

John M. Bolster, Minneapolis, Minn., assignor to Edward Traficante, Minneapolis, Minn.

Application March 26, 1938, Serial No. 198,243

7 Claims. (Cl. 84—376)

My invention relates to accordions and particularly to devices for producing tremolo effects therewith.

A general object is to provide means whereby an accordion may be caused to produce a tremolo effect other than as a result of special manipulation on the part of the person playing the accordion.

A more specific object is to provide a power-operated device for imparting a vibratory component of movement to one of the wind boxes of an accordion.

Another object is to provide such a device of an electrically powered nature and including means for adjustively varying the speed of operation thereof and hence the type of tremolo effect produced.

A further object is to provide such a device of light, compact, simple and inexpensive construction and adapted for easy installation in a conventional accordion.

These and further objects and advantages of the invention will more fully appear from the following description made in connection with the accompanying drawing, which is a partially broken-away front view of an accordion having an embodiment of my invention incorporated therein.

Referring to the drawing I have shown an embodiment of my invention associated with an accordion A having respective wind boxes 1 and 2 connected together by means of a bellows 3 in the usual manner.

In general my tremolo-producing device consists of means for imparting a vibratory component of movement to one of the wind boxes of an accordion in addition to the normal movements of the wind boxes produced by the user of the instrument. To produce the vibratory movement I employ a weight which is movable relative to one of the wind boxes in a direction of which at least a component thereof is parallel to the direction of expansion and contraction of the bellows 3. Preferably the weight is moved by power means and its speed of movement is regulatable as will be explained in connection with the embodiment illustrated in the drawing.

In the illustrated embodiment I provide an electric motor 4 having a power out-put shaft 4a. The electric motor is mounted on a suitable portion of one of the wind boxes, such as the wind box 1, by means of a bracket 5. Preferably the axis of the shaft 4a should lie in a plane normal to the direction of expansion and contraction of the bellows 3.

On the shaft 4a of the motor 4 I provide a weight 6 mounted thereon in eccentric relation thereto and secured to the shaft 4a by means of a set screw 7. The weight 6 is, of course, suitably apertured for mounting on the shaft 4a, as shown. There is provided a screw threaded aperture disposed radially of the shaft 4a and adapted to receive the set screw 7.

For delivering electrical energy to the motor 4 I provide an electrical connection fitting 8 which may be of any desired conventional form and to which is connected an electrical cord 9 which may be connected to any suitable source of electrical energy.

I provide means for adjustively varying the speed of the motor 4 so that the frequency of the vibratory movement imparted to the wind box 1 may be varied for the purpose of varying the tremolo effect produced. For this purpose I provide a motor speed regulating rheostat 10 mounted on the accordion A in any desired location and with the operating knob 10a thereof disposed externally of the accordion A to permit convenient manipulation. From the electrical fitting 8 to the motor 4 I provide one wire 11 making a direct connection from the fitting 8 to the motor 4. I also provide another wire 12 running from the fitting 8 to the rheostat 10 and a third wire 13 running from the rheostat 10 to the motor 4. The electrical connections of the motor 4, rheostat 10 and wires 11, 12 and 13 are such that the rheostat 10 is inserted in series with the electrical circuit from the cord 9 to the motor 4.

In normal use of an accordion the operator of the same manipulates the instrument to cause relative movement between the wind boxes 1 and 2 such that the bellows 3 will be alternately extended and contracted. With the motor 4 in operation the rotation of the eccentric weight 6 will produce a reaction imparting vibratory movement to the wind box 1, and such vibratory motion will act as a component of movement superimposed upon the previously mentioned relative movement of the wind boxes 1 and 2 produced by the operator of the instrument. It should be apparent that the addition of the component of movement afforded by the eccentric weight 6 will cause a pulsation in the air pressure produced by the bellows 3 and will accordingly cause the instrument to produce sound having a tremolo effect. The frequency of the tremolo effect is, of course, readily adjustable by adjustively turning the rheostat 10a to obtain desired speed of operation of the motor 4.

It is apparent that I have invented a novel, useful, effective, simple and inexpensive tremolo-producing device for accordions.

It will, of course, be understood that various changes may be made in the form, details, proportions, and arrangement of the various parts without departing from the scope of my invention.

What is claimed is:

1. In combination with an accordion having a pair of wind boxes connected together by a bellows, a tremolo-producing device comprising, a weight mounted on one of said boxes for movement relative thereto about an axis displaced from the center of mass of said weight, and means for moving said weight about said axis in relatively rapidly recurring cycles.

2. The combination defined in claim 1 and means for adjustively varying the frequency of occurrence of said cycles.

3. In combination with an accordion having a pair of wind boxes connected together by a bellows, a tremolo-producing device comprising, a weight mounted on one of said boxes for rotation about an axis disposed eccentrically of the center of mass of said weight, and means for imparting rotation to said weight so that said box will be vibrated thereby.

4. In combination with an accordion having a pair of wind boxes connected together by a bellows, a tremolo-producing device comprising, a weight mounted on one of said boxes for rotation about an axis disposed at an angle to the direction of expansion and contraction of said bellows and eccentrically of the center of mass of said weight, and means for imparting rotation to said weight so that said box will be vibrated thereby.

5. In combination with an accordion having a pair of wind boxes connected together by a bellows, a tremolo-producing device comprising, a motor mounted on one of said boxes and having a power output shaft, and a weight eccentrically mounted on said shaft for imparting vibration to said box responsive to operation of said motor.

6. In combination with an accordion having a pair of wind boxes connected together by a bellows, a tremolo-producing device comprising, an electric motor mounted on one of said boxes and having a power output shaft, a weight eccentrically mounted on said shaft for imparting vibration to said box responsive to operation of said motor, and means for adjustively varying the speed of said motor.

7. The combination with an accordion having a pair of wind boxes connected together by a bellows of a tremolo-producing device comprising, an electric motor secured to one of said boxes interiorly thereof and having a power output shaft disposed generally normal to the direction of expansion and contraction of said bellows, a weight eccentrically mounted on said shaft for imparting vibratory movement to said box responsive to operation of said motor, and a speed-adjusting rheostat electrically associated with said motor for control thereof and mounted on said accordion for manipulation from a point exteriorly thereof.

JOHN M. BOLSTER.